Feb. 2, 1971   G. J. BOTTOMLEY ET AL   3,559,233
METHOD AND APPARATUS FOR EVISCERATING POULTRY
Filed April 24, 1969   2 Sheets-Sheet 1
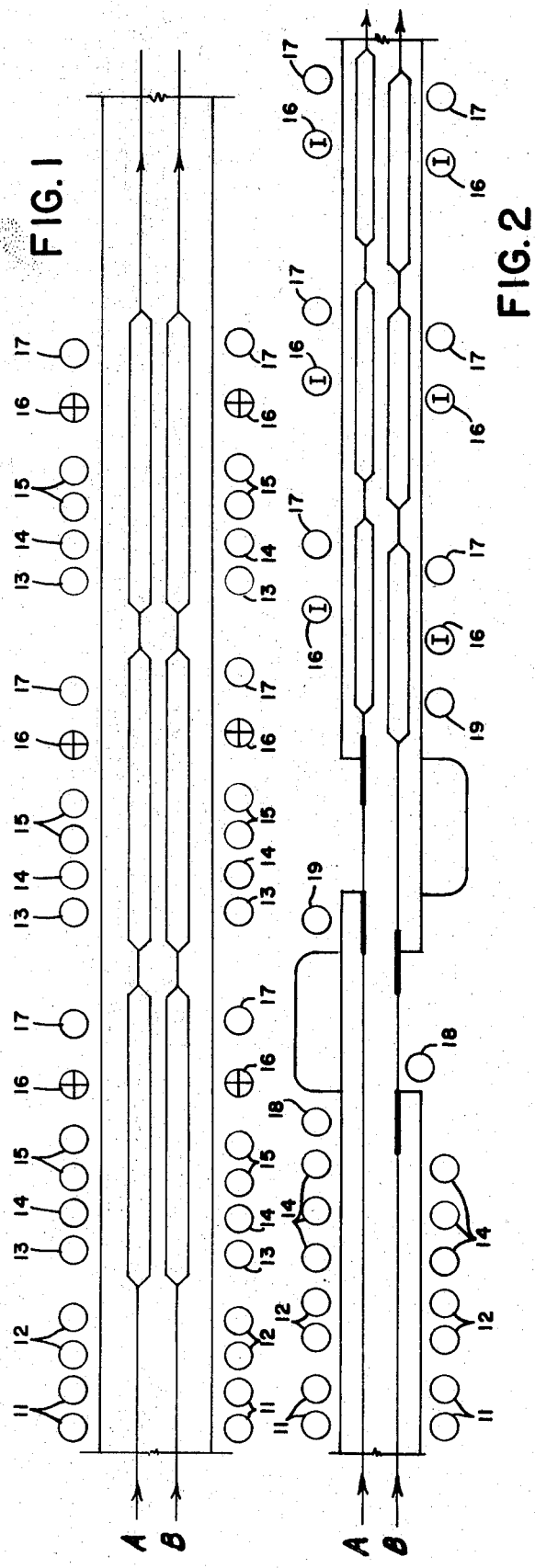
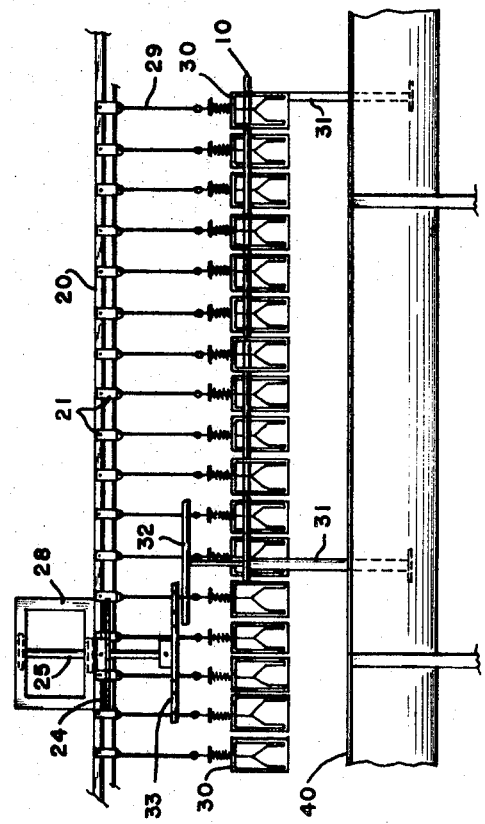
INVENTORS.
GARY J. BOTTOMLEY
WILLIAM M. NICHOLS
CLYDE D. WATKINS
LARRY D. WILSON Feb. 2, 1971 G. J. BOTTOMLEY ET AL 3,559,233
METHOD AND APPARATUS FOR EVISCERATING POULTRY
Filed April 24, 1969 2 Sheets-Sheet 2
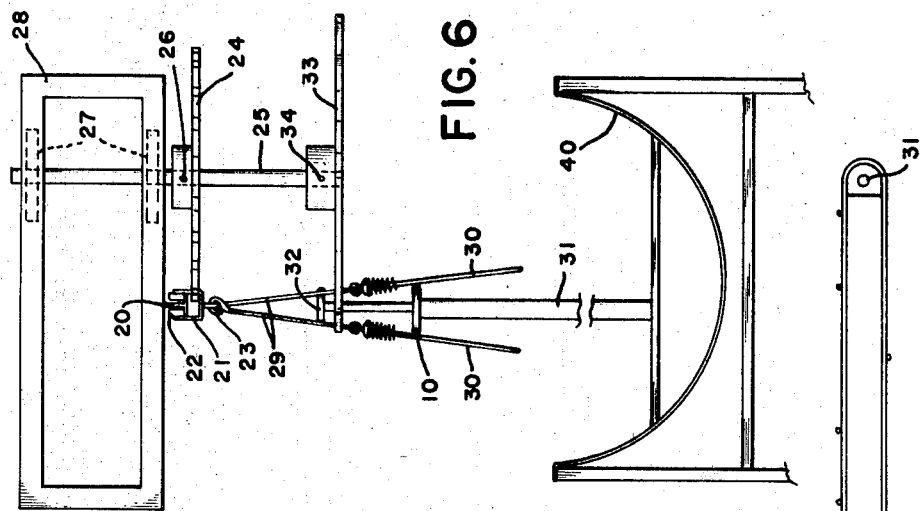
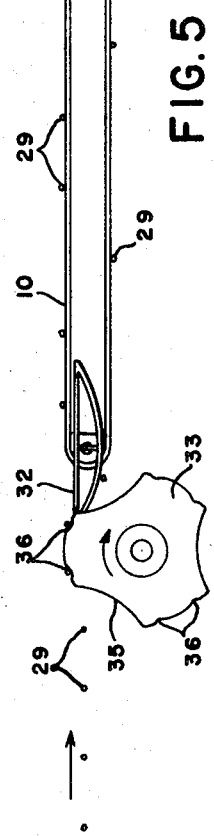
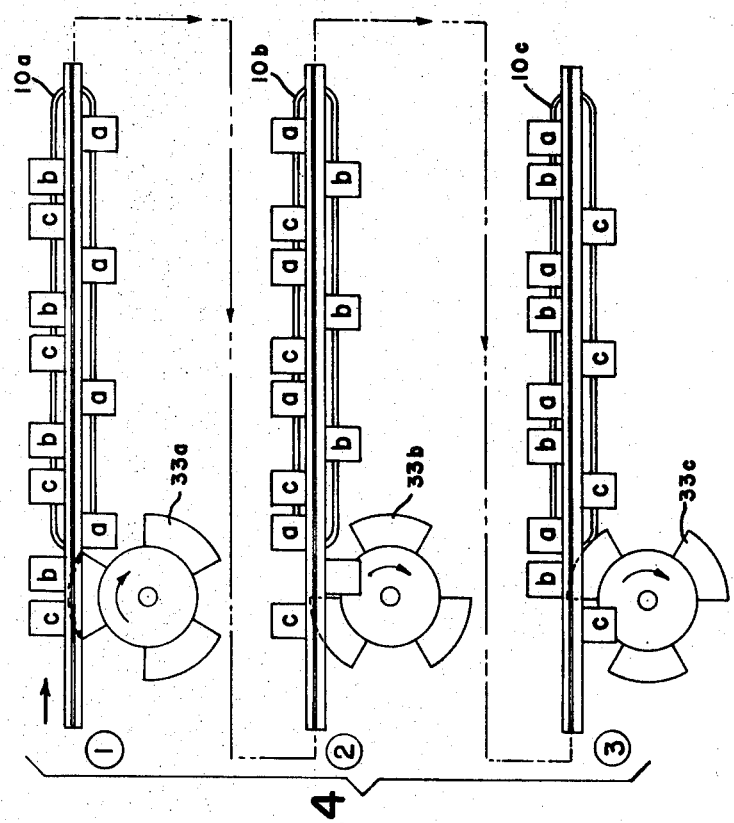
INVENTORS.
GARY J. BOTTOMLEY
WILLIAM M. NICHOLS
CLYDE D. WATKINS
LARRY D. WILSON

United States Patent Office

3,559,233
Patented Feb. 2, 1971

3,559,233
METHOD AND APPARATUS FOR EVISCERATING POULTRY
Gary J. Bottomley, P.O. Box 88, Wilkesboro, N.C. 28697; William M. Nichols, Rte. 4, Box 654, North Wilkesboro, N.C. 28659; Clyde E. Watkins, Box 125, Millers Creek, N.C. 28651; and Larry D. Wilson, Kenleigh Circle, Ken Acres, Wilkesboro, N.C. 28697
Filed Apr. 24, 1969, Ser. No. 818,946
Int. Cl. A22c 21/00
U.S. Cl. 17—45                     5 Claims

ABSTRACT OF THE DISCLOSURE

A system for diverting, sequentially, predetermined series of birds from a predetermined path of travel to prescribed paths of travel to present each predetermined series of birds to respective inspection stations longitudinally spaced from each along an eviscerating line. Upper and lower spaced guides cooperate with a drive wheel to convey shackles, of a chicken eviscerating line, to one of two sides of the guides to increase the spacing between shackles presented to an inspection station.

BACKGROUND OF THE INVENTION

The commercial broiler industry has experienced extremely rapid growth in the last several years. In order to handle the processing operation in marketing the increasing quantity of chickens, it has been necessary to develop and devise new operating methods and equipment. This invention relates to a novel method and apparatus for dividing shackles, having birds mounted thereon, equally among a plurality of work stations spaced along an eviscerating line as the shackles are conveyed along said line.

In the eviscerating area, where an inspection is performed on each poultry carcass, the layout of the inspection station and the manner in which the carcass is presented for examination are of major importance. However, the number of birds that an inspector can properly examine in a given period of time depends on many things. The manner in which the carcass is presented for inspection, the distance between birds, and the time an inspector has to spend in reaching, searching and positioning the birds are a few of the variables determining the rate of inspection. Shackle spacing plays a very significant role in limiting the rate at which proper inspection can be accomplished. Time studies show, for instance, that an inspector can examine birds better and faster if individual birds are spaced on twelve inch centers rather than the normal six inch centers. The time required to search for, grasp and control a bird increases when the birds are in a congested group. Heretofore, attempts have been made to increase the production rate of inspection by providing two or more inspectors on an eviscerating line and permitting such inspectors to examine alternate birds or every third bird. However, the number of birds examined in a given period of time utilizing such methods actually decreased primarily due to additional time required for searching, reaching and positioning the prior designated birds. The less time an inspector has to spend in reaching, searching, positioning, and other functions, the more time is available for the essentials of proper inspection. Frequently horizontal conveyor flights ascend vertically causing adjacent shackles on close spacing to come closer to each other and adjacent birds will contact each other increasing the danger of fecal contamination between adjacent birds during evisceration operations.

SUMMARY OF THE INVENTION

The present invention is directed to a method and apparatus for properly, optimumly spacing and presenting birds to work stations or locations as they are conveyed along a processing line. The birds are conveyed to an automatic eviscerator and are subsequently equally divided by a suitable mechanism to guide the birds to various work locations where inspecting, trimming and other operations are performed thereon. A plurality of such work stations are provided along each production line to receive an equal number of the birds being conveyed. Since the birds conveyed to a particular work location are displaced by the dividing mechanism from the normal path of travel, it is possible to increase the spacing between adjacent birds. By spacing the birds a greater distance apart, unnecessary hand motions are eliminated, thus increasing the time available for inspection and other related functions thereby making it possible to derive greatly increased production and high quality performance.

Alternatively, the poultry can be conveyed in a manner such that only oil gland removal and bar cut functions are performed prior to the poultry reaching the dividing mechanism. Upon being diverted to preselected work locations each bird has vent removal, viscera drawing, inspection, trimming and other related functions performed thereon manually by operators spaced along the conveying line.

One of the primary objects of this invention is the provision of a process and apparatus for displacing a single line of poultry being conveyed along a process line into preselected, different, directed paths of travel during evisceration operations.

Another object of the invention is to increase the productivity and quality of workmanship of processing lines by increasing the spacing between adjacent birds presented to an inspector and by improvement of work location layouts.

Still another object of the invention is to increase production, reduce costs, and conserve space by displacing selected birds to selected work locations for performing eviscerating operations thereon.

These and other objects of the present invention will become apparent to those skilled in the art from a consideration of the following detailed description taken in conjunction with the accompanying drawings.

BRIEF DESCRIPTION OF THE FIGURES

FIG. 1 is a schematic flow diagram of parallel poultry processing lines illustrating various work stations and the shackle dividing mechanisms.

FIG. 2 is a schematic flow diagram of poultry processing lines similar to FIG. 1 and illustrating automatic eviscerators positioned along the processing lines.

FIG. 3 is a fragmentary side view of a processing line illustrating a plurality of spaced shackles and the mechanism for diverting the shackles into various prescribed paths of travel.

FIG. 4 is a schematic plan view of a poultry processing line illustrating the manner in which predetermined birds are diverted to prescribed paths of travel for inspection.

FIG. 5 is a schematic plan view of a portion of a processing line illustrating the manner in which the push wheel and dividers cooperate to divert predetermined shackles into various paths.

FIG. 6 is a cross-sectional view of a processing line illustrating the relationship of the shackles with respect to the dividers, push wheel and offal trough.

DETAILED DESCRIPTION OF THE INVENTION

In preparing the chicken carcass into ready-to-cook form, many operations are thought of in the industry as a part of the eviscerating process. FIGS. 1 and 2 depict various work stations or operations performed on a single poultry carcass during the evisceration process. In each of FIGS. 1 and 2, two processing lines A and B are arranged such that a series of work stations are positioned along each line where various operations are sequentially performed on birds conveyed along the line.

In FIG. 1, reference numeral 11 designates work stations where the preen or oil gland, located at the junction of the bird's tail and back, is removed. The bar cut or opening cut, usually made in the bird's abdomen to remove the viscera, is performed at work stations 12. Numerals 13 designate work stations where pin feathers are removed from the birds. The vent removal operations are performed at work stations 14. Reference numeral 15 represents work stations where the viscera are withdrawn from the birds. The viscera must be removed with skill and care to avoid fecal contamination of the carcass and to prevent utilization in loss of edible parts. The viscera of each bird must retain their identity with the bird from which they were drawn until they have been examined by an inspector. The common method is to let the viscera hang outside the body cavity, attached to the carcass. The manner in which the viscera are left suspended has a direct effect on the inspection operations performed at work stations 16. The carcasses should enter the inspection stations 16 with all viscera completely drawn and hanging on the same side of each bird in full view of the inspector to facilitate rapid inspection. After proper examination, the carcasses are conveyed to the trim stations 17 where rejected birds and parts designated by the inspector are removed or trimmed off, and rejected birds are discarded from the line. The trim stations 17 must be arranged to provide maximum assistance to the inspectors at stations 16.

FIG. 2 illustrates processing lines similar to that of FIG. 1 wherein the viscera are automatically withdrawn by mechanical eviscerators, rather than being manually withdrawn. Automatic eviscerators of this type are manufactured by the Gordon-Johnson Company of Kansas City and are distributed under the trademark "Evisarator I." Although arranged in somewhat different sequence, from that of FIG. 1, substantially the same operations are performed on the carcasses of the processing line of FIG. 2. Additional stations are provided to feed the carcass to the automatic eviscerators, as designated by reference numeral 18 and to position the carcasses for proper inspection upon leaving the automatic eviscerators, as designated by reference numeral 19.

It is to be noted that in each of FIGS. 1 and 2, a plurality of inspection stations has been positioned on each side of the processing lines. A plurality of dividers 10 has been diagrammatically shown, one adjacent each inspection station 16. The functions of the dividers are to divert certain of the birds being processed to predetermined inspection stations. For example, the birds conveyed along line A, in the direction of the arrow of FIG. 1, after having the oil bag removal and bar cut operations performed thereon, are fed to the first of three dividers 10. Suitable means cooperable with each of the dividers, has been positioned to divert preselected birds to one side of the first divider while the remaining birds travel to the opposite side of the first divider as will appear more fully hereafter. After inspection of the diverted preselected birds, all birds are returned thereafter initially to their original path of travel. A second, preselected group of birds is then diverted from the line of travel of all birds to the second inspection station adjacent the second divider while the remaining birds, including those initially inspected, are diverted to the opposite or back side of the second divider. At the third divider, the third and final group of birds is diverted to the third inspection station while the first and second groups of birds, previously inspected, are diverted to the back side of the third divider. The mechanism for diverting the birds into various paths will be subsequently described.

An overhead monorail 20. supported in a conventional manner, receives a series of brackets 21 having wheels 22 mounted thereon for rolling upon the monorail, as shown in FIG. 6. The brackets are maintained on conventional center-line spacings by conventional means, not shown, to provide a constant distance between each of the brackets. A bracket drive wheel 24 fixed upon shaft 25 by a suitable fastener 26 is driven at a constant speed by a conventional driving means, not shown. The shaft 25 is rotatably supported in bearings 27 mounted on frame 28. The bracket drive wheel is provided with circumferential spaced drive lugs for engaging and displacing the brackets 21 along the rail 20. Each bracket 21 has a downwardly extending flange portion 23 with an opening therein for receiving a hooked end portion of a drop rod 29. Attached to the lower end of each drop rod 29 is a conventional bird-supporting shackle 30.

Positioned directly underneath the rail 20 are posts 31 that are longitudinally spaced from each other along the path of shackle travel for supporting lower shackle dividing members 10 and upper drop rod dividing members 32. An offal trough 40 is provided under the processing line for receiving and transporting the offal. A shackle push wheel 33 having an irregular shaped outer peripheral surface, one preferred embodiment being shown in FIG. 5, is secured by fastener 34 to rotate with the driven shaft 25. Since the bracket drive wheel 24 and shackle push wheel 33 are secured to the same shaft 25, shackle push wheel 33 engages the drop rods 29 supporting the shackles 30 as they are conveyed along the processing line.

The shackle push wheel 33 is divided into equal segments of a number corresponding to the number of inspection stations 16 provided on one side of a particular processing line. A recessed portion 35 and outer push or cam portions 36 are provided on the outer periphery of each wheel segment. By positioning the upper divider 32 and the lower divider 10 adjacent the shackle push wheel 33, as shown in FIG. 5, and keeping in mind that the shackle push wheel 33 is driven at the same speed that drop rods 29 are being conveyed along a processing line, it can be seen that two of every three of the drop rods 29 are diverted by portions 36 of wheel 33 to one side of upper divider 32 while one drop rod of every three, in sequence, falls within recess portions 35 of rotating wheel 33 and will be guided by the upper divider 32 to the opposite side of the divider 32. As the diverted rods 29 continue along the processing line, the shackles 30 attached to the rods engage the lower divider 10 on one side or the other, as illustrated by FIG. 5, depending upon the displaced path of travel. The bottom divider 10 is positioned so that the guide rails may be about three inches below the top of the shackles 30 supported on drop rods 29 so as to position and give a firm drag to the moving shackles to prevent shackle swinging and rotation. By dividing the shackles in this manner, the spacing between birds is increased and the birds are properly positioned so that an inspector can examine the birds better and faster as a limited number pass him.

Referring particularly to FIG. 4, the manner by which the birds are divided into predetermined groups will now be described. FIG. 4 represents a schematic plan view of a single processing line having a series of three inspection stations positioned therealong, similar to line B of FIG. 1 or FIG. 2. The shackles 30, having birds mounted thereon, are represented by blocks $a$, $b$ and $c$. Shackle push wheels 33a, 33b, 33c and dividers 10a, 10b, 10c equally divide the birds into groups as they are conveyed along the processing line. Birds $a$, $b$ and $c$ are conveyed in a predetermined path towards the rotating wheel 33a whereupon every third bird $a$ moves within the previously described recessed portions 35 and is divided to one side of the divider 10a while the next two birds $b$ and $c$ are pushed by portions 36 to the opposite side of divider 10a. As can be seen, the spacing between birds a has been increased as the bird moved to an inspection station 16. As birds a, b and c reach the end of divider 10a, all birds return to the common predetermined path until such time that they reach a second push wheel 33b spaced longitudinally along the directed path of travel of the birds where a second series of birds b is presented to an inspection station while birds a and c are diverted to the backside of divider 10b. Subsequently, a third series of birds c is presented to an inspection station as birds a and b are diverted by wheel 33c. It is important to note that the wheels 33a, 33b and 33c are out of phase each with respect to the other in order to present a different series of birds to each of the three inspection stations, assuming that only three separate inspection stations are employed in the processing line. For example, the shackle push wheels 33a, 33b and 33c are displaced approximately forty degrees out of phase with each other.

By diverting predetermined birds to prescribed inspection stations, it is possible to increase significantly production line speeds while maintaining quality processing.

While this system has been described utilizing three sets of push wheels, dividers, and inspection stations for each side of a processing line, it is obvious that more or less inspection stations could be provided by merely modifying shackle push wheels and changing the number of push wheels and dividers to correspond to the number of inspection stations desired.

We claim:
1. The method of processing birds comprising the steps of: continuously conveying a plurality of predetermined series of suspended birds longitudinally along a prescribed path of travel with the birds of each series being alternately spaced intermediate the birds of the other series, automatically displacing a first predetermined series of birds, equally spaced longitudinally from each other intermediate the spaced birds of the other series, from the prescribed path of travel to a predetermined path of travel while retaining the other predetermined series of birds, spaced intermediate the birds of the first predetermined series in a path of travel other than the displaced path of travel.

2. The method of claim 1, and further including inspecting the first predetermined series of displaced birds.

3. The method of claim 1, and further including eviscerating the birds prior to their being displaced from a prescribed path of travel.

4. The method of claim 1, and further including eviscerating the birds after they have been displaced from the prescribed path of travel.

5. The method of claim 2, and further including the steps of returning all birds to the prescribed path of travel with the birds of the first predetermined series being alternately spaced intermediate the birds of the other predetermined series, displacing a second predetermined series of spaced birds from said prescribed path while retaining the first predetermined series and a third predetermined series in a path of travel other than the path of travel of the displaced second series of birds, inspecting said second predetermined series of birds, returning all birds to the prescribed path of travel, displacing a third predetermined series of spaced birds from said prescribed path while retaining the first and second predetermined series of birds in a path of travel other than the path of travel of the displaced third predetermined series of birds, and inspecting the third predetermined series of birds.

References Cited

UNITED STATES PATENTS

| 447,840 | 3/1891 | Moyer | 17—24 |
| 2,381,044 | 8/1945 | Franz | 17—45 |
| 3,124,831 | 3/1964 | Altenpohl | 17—11 |

FOREIGN PATENTS

| 1,253,928 | 1/1961 | France | 17—24 |

LUCIE H. LAUDENSLAGER, Primary Examiner

U.S. Cl. X.R.

17—11, 24

Notice of Adverse Decisions in Interferences

In Interference No. 97,769 involving Patent No. 3,559,233, G. J. Bottomley, W. M. Nichols, C. E. Watkins and L. D. Wilson, METHOD AND APPARATUS FOR EVISCERATING POULTRY, final judgment adverse to the patentees was rendered June 19, 1973, as to claims 1, 2 and 5.

[*Official Gazette October 23, 1973.*]